July 23, 1940. F. J. RODIN 2,209,282
POTATO DIGGING AND HARVESTING MACHINE
Filed Jan. 18, 1939 6 Sheets-Sheet 1

Inventor
Fritz J. Rodin
By Kimmel & Crowell
Attorneys

Patented July 23, 1940

2,209,282

UNITED STATES PATENT OFFICE 2,209,282

POTATO DIGGING AND HARVESTING MACHINE

Fritz Joakim Rodin, Chatham Center, N. Y.

Application January 18, 1939, Serial No. 251,610

10 Claims. (Cl. 55—51)

This invention relates to potato digging and harvesting machines and is an improvement over the potato digging and harvesting machines embodied in my prior Patents No. 1,975,668, issued October 2, 1934, and No. 2,027,840, issued January 14, 1936.

An object of this invention is to provide a potato digging and harvesting machine which is so constructed that it can be used for the digging and harvesting of potatoes under varying conditions, that is, where the ground is wet at the time the potatoes are dug and adheres to the potatoes or where the vines are green and the potatoes will not readily separate from the vines.

Another object of this invention is to provide a machine of this kind which is adapted to clean the dirt from the potatoes during the passage of the potatoes through the machine, discharge the emptied vines onto the ground and then carry the cleaned potatoes through the grading devices forming part of the machine after which the potatoes will be discharged into sacks which may be carried by the machine at the end of the grading devices.

A further object of this invention is to provide an improved separating means for separating the vines from the potatoes which is so constructed that where the ground is wet an improved dirt removing means may be mounted on the machine or when the vines are green and the ground is dry, the dirt removing means for the wet ground may be removed and a different type of dirt and vine removing means may be mounted on the machine.

A still further object of this invention is to provide a machine of this kind which if desired, may have one or more digging members associated therewith so that the single machine may be capable of digging one or more rows of potatoes at the same time and clean, grade and bag the potatoes as the machine moves along the rows.

To the foregoing objects and others which may hereinafter appear, the invention consists of the novel construction, combination and arrangement of parts as will be more specifically referred to and illustrated in the accompanying drawings, wherein is illustrated an embodiment of the invention, but it is to be understood that changes, variations and modifications may be resorted to which fall within the scope of the invention as claimed.

Referring to the drawings, the numeral 20 designates a pair of parallel frame bars which at their rear ends are secured to downwardly inclined bars 21 which are secured to an axle 22. The axle 22 carries a pair of wheels 23. The frame bars 20 are provided on the opposite sides thereof with a pair of shields or vertically disposed guard members 24 which are secured to the angle frame members 20. The frame members 20 at their forward or lower ends have secured thereto a plow or digging member 25, and a pair of draw bars 26 having downwardly inclined end portions 27 are secured to the frame members 20 at a point upwardly or rearwardly from their forward ends. A pair of disc-shaped shields 28 are rotatably carried by vertically disposed arms 29 and the arms 29 are secured to a horizontal bar 30. The horizontal bar 30 is pivotally secured as at 31 to the lower end of a supporting bar 32 which at its upper end is fixedly secured to a draw bar 26. The disc members 28 are disposed in forwardly divergent relation so that as the device moves over the ground the shields or disc members 28 will direct the material towards the chute comprising the frame members 20 and the side members 24. A conveyor 33 is carried by the frame members 20 between the side walls 24 thereof and comprises parallel spaced apart bars or links provided with interlocking ends 35. The conveyor 33 is of endless construction and the forward run is trained over sprockets 36 carried by a shaft 37 which is journalled between the frame bars 20.

The conveyor 33 extends in a parallel direction on its upper run to the upper surface of the two bars 20 and the rear portion of the conveyor 33 is trained over a pair of sprockets 38ª which are mounted on a shaft 38. The shaft 38 is rotated by a chain 39 which is trained over a sprocket 40 carried by a drive shaft 41. The drive shaft 41 has a driving chain 42 trained over a driving sprocket 43 secured thereto and the driving chain 42 may be connected to a suitable source of power supply (not shown). A plurality of rotating vine cutting blades 44 are mounted on a shaft 45 which is supported by a pair of supporting bars 46 secured to the draw bars 26 adjacent the rear portion of the plow 25 and the shaft 45 has a sprocket 47 fixed thereto about which a chain 48 is trained. The chain 48 is also trained over a sprocket 49 fixed to a shaft 50 which is supported by supporting bars 51 carrying bearings 52. A chain 53 is trained over a second sprocket 55 secured to the shaft 50 and is also trained over a sprocket 54 which is fixed to the shaft 38. In this manner movement of the conveyor 33 under rotation of the shaft 38 will simultaneously effect rotation of the vine cutting blades 44 so as to cut the vines during the initial movement of the vines through the machine.

Figures 2, 13, 14:
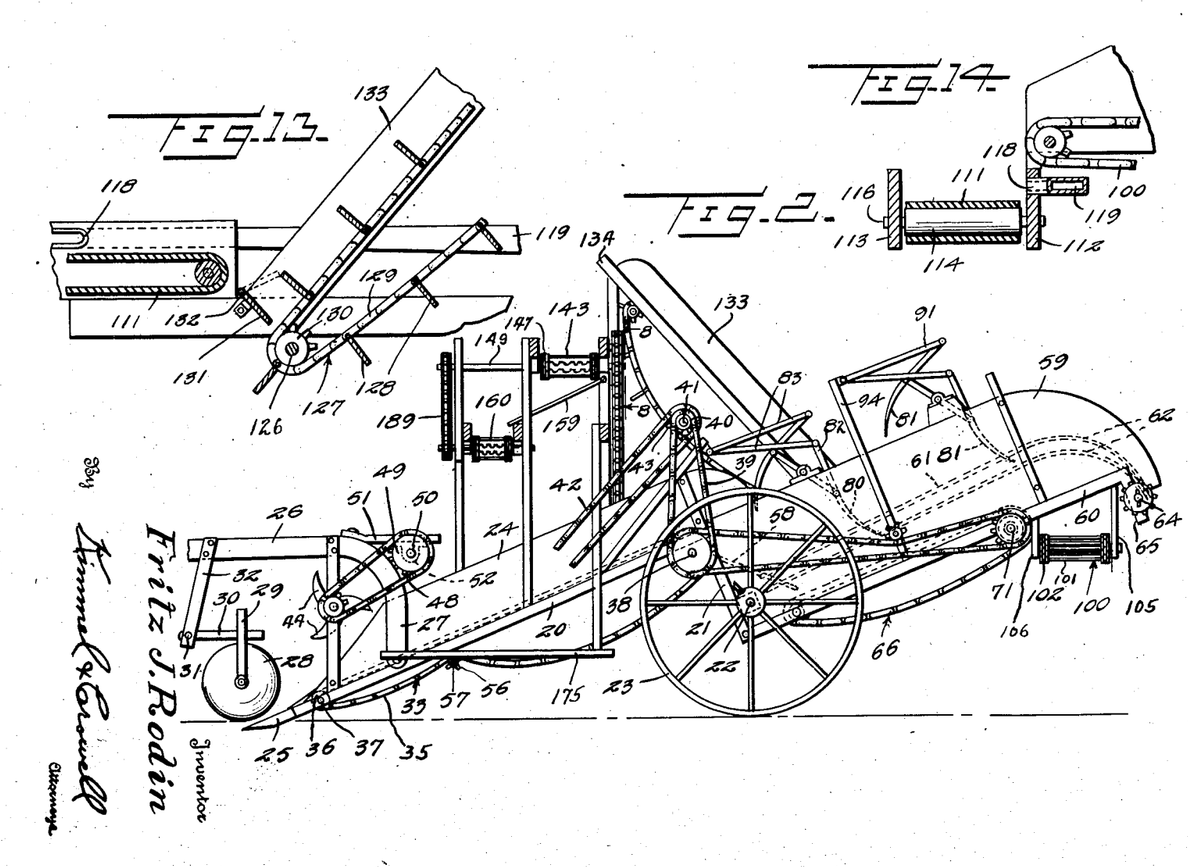
Figure 2 is a sectional view partly in detail taken on the line 2—2 of Figure 1.
Figure 13 is a fragmentary sectional view taken on the line 13—13 of Figure 1.
Figure 14 is a fragmentary sectional view taken on the line 14—14 of Figure 1.

The lower run of the conveyor 33 is trained over a pair of idler sprockets 56 which are carried by shafts 57 rotatably supported beneath the frame members 20. The conveyor or elevator 33 discharges the potatoes and vines onto a downwardly inclined combined director and shield 58 which is supported between a pair of vertically disposed walls or chute members 59 fixed to a pair of upwardly and rearwardly inclined frame members 60. The frame members 60 are secured to the lower ends of the bars 21 and the forward ends of the chute members 59 may also be secured to the frame members 21. The shield 58 discharges the potatoes and vines as shown in Figure 2 onto a pair of rows of spaced bars 61. The bars of each row are arranged in parallel spaced relation. The contour of the bars of each row are substantially the same. The potatoes and the vines are adapted to be pushed rearwardly upon the bars 61 by a means to be referred to and the bars 61 act to separate the potatoes from the vines. The bars 61 are disposed between the chute members 59 and extend upwardly and rearwardly from the shield 58, being provided with downwardly curved upper end portions 62 which may be secured to a bar 63 and the ends of said bar rest in the same bearings as are provided for the shaft 64. The shaft or bar 64 is carried by a downwardly inclined extension 65 carried by each of the frame members 60. The bars 61 are spaced apart a distance sufficient to permit the potatoes to drop therebetween but the vines are adapted to move forwardly and upwardly along the bars 61. The potatoes dropping through the bars 61 fall onto a conveyor generally designated as 66. The conveyor 66 comprises a plurality of parallel bars or links 67 provided with interlocking ends 68 which are trained over sprockets 69 and 70. The sprockets 69 are secured to a shaft 71 rotatably carried by the frame members 60 and the sprockets 70 are secured to a shaft 72 rotatably carried by the frame members 60 adjacent the forward or lower portions thereof. The shaft 71 has a sprocket 73 secured thereto about which a chain 74 is trained and this chain 74 is also trained over a sprocket 75 carried by a shaft 76. The shaft 76 is operatively connected to the shaft 38 by means of a chain 77 engaging sprockets 78 and 79 carried by the shafts 76 and 38 respectively.

Figures 4, 5, 19, 20:
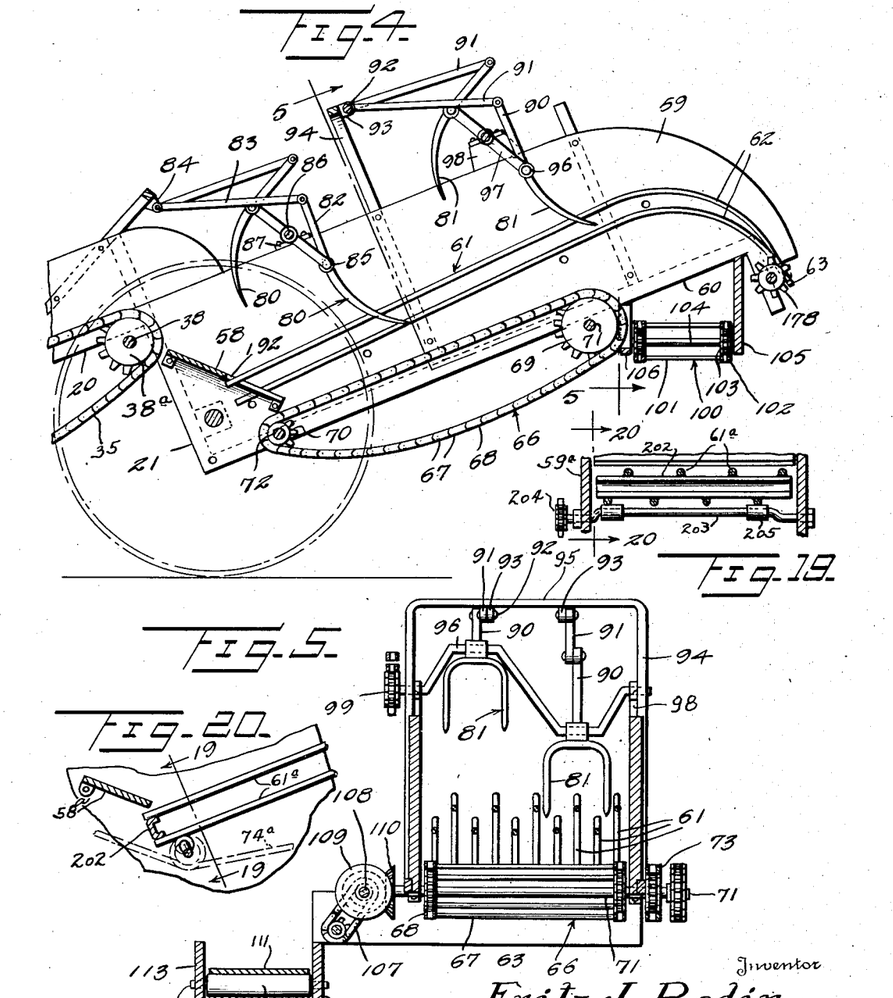
Figure 4 is a sectional view taken on the line 4—4 of Figure 1.
Figure 5 is a sectional view taken on the line 5—5 of Figure 4.
Figure 19 is a sectional view taken on the line 19—19 of Figure 20, showing a modified form of a portion of the structure shown in Figure 4.
Figure 20 is a sectional view taken on the line 20—20 of Figure 19.

As shown in Figures 4 and 5, the bars 61 of one row are arranged above and disposed in staggered relation with respect to the bars 61 of the other row. The bars 61 may be used where the vines are green and adhere to the potatoes or where the ground is relatively dry. The vines engaging on the bars 61 are moved therealong by means of a plurality of pushers in the form of forks 80 and 81. The forks 80 and 81 are identical in construction each includes an inverted substantially U-shaped body formed with a pair of tines or prongs curving rearwardly from their upper to their lower ends as shown in Figure 5. The forks 80 are each provided with a stem 82 which has a link 83 secured to the upper end thereof. The stems 82 are integral with the bights of the bodies of the forks 80. The link 83 is rockably secured at its rear end to a supporting member 84 and each fork 80 is also pivotally mounted on a cranked portion 85 of a crank shaft 86. The crank shaft 86 is rotatalby carried by bearings 87 secured to the side chute members 59 and the crank shaft 86 is rotated by means of a sprocket 88 over which a chain 89 engages. Each fork 81 is similar to the fork 80 and comprises a stem 90 integral with the bight of the body. A link 91 is pivotally secured at one end to the upper end of the stem 90. The link 91 is rockably secured at its rear end to a pivot 92 carried by a bearing structure 93. The bearing structure 93 is carried by a substantially inverted U-shaped supporting member 94 which has the parallel legs thereof engaging on the outer sides of the chute members 59, with the bight 95 thereof extending across and above the two chute members 59. The forks 81 are each pivotally connected to a cranked portion 96 of a crank shaft 97 which is rotatably carried by bearings 98 fixed to the two side chute members 59. The crank shaft 97 has a sprocket 99 secured to one end thereof over which the chain 89 engages so that movement of the chain 89 will effect oscillation of the forks or fingers 80 and 81 through rotation of the crank shafts 86 and 97.

In the present instance there are two forks 80 and two forks 81 pivotally mounted on, connected to and bodily carried with the crank shafts 86 and 97 respectively on the rotation of such shafts. However, I do not wish to be limited to the number of crank shafts used or to the number of forks which may be secured to such crank shafts. Oscillation of the forks 80 and 81 will tend to throw or move the vines rearwardly and upwardly along the bars 61 and such vines are then discharged over the forward or curved end portions 62 of the bars 61 and dropped downwardly onto the ground rearwardly of the machine.

The potatoes which drop through the bars 61 and fall onto the elevator or conveyor 66 are carried rearwardly and upwardly and then discharged onto a transverse conveyor 100 comprising parallel spaced apart bars or links 101 provided with interlocking ends 102. The conveyor 100 is trained over sprockets 103 fixed to shafts 104 which are rotatably carried by frame members 105 and 106. The frame members 105 and 106 extend downwardly in parallel relation from the frame members 60 being secured at their upper ends to the frame members 60 and preferably, the member 105 comprises a relatively wide shield which prevents the potatoes from rolling off of the conveyor 100. The conveyor 100 is operated by means of a chain 107 which is trained over a sprocket which is carried by a shaft 108. The shaft 108 has a gear 109 which meshes with a gear 110 carried by the shaft 71.

Figures 3, 15, 16, 17, 18:
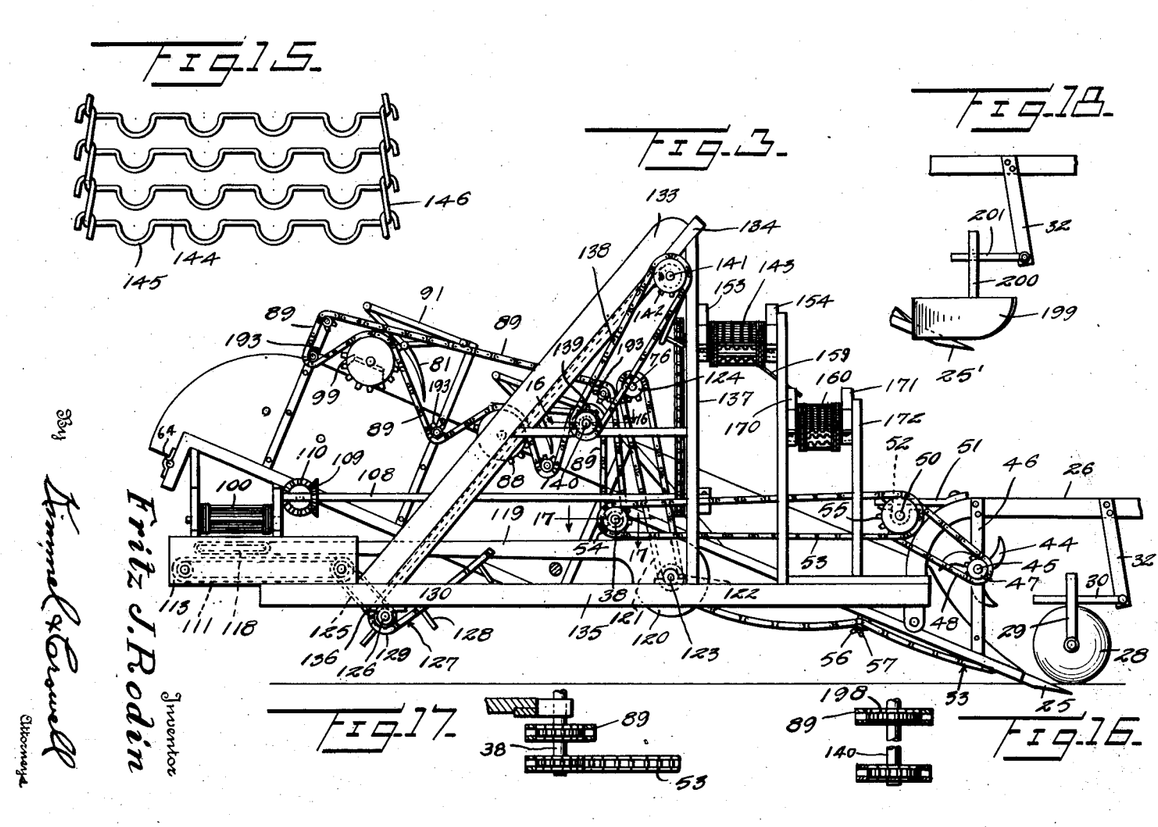
Figure 3 is a detail side elevation looking at the machine from the side opposite to that shown in Figure 2.
Figure 15 is a fragmentary plan view of one of the grading members.
Figure 16 is a fragmentary sectional view taken on the line 16—16 of Figure 3.
Figure 17 is a fragmentary sectional view taken on the line 17—17 of Figure 3.
Figure 18 is a fragmentary side elevation of a modified form of shield associated with the plow or digger at the front end of the machine.

The potatoes on the conveyor 100 are discharged onto a longitudinal and horizontal conveyor 111 which is disposed between frame members 112 and 113 being trained about rollers 114 and 115 which are mounted on shafts 116 and 117 respectively, journalled between the frame members 112 and 113. The conveyor 111 is disposed as shown in Figure 13 below the discharge end of the conveyor 100 and in order to provide a means whereby dry particles such as dirt or the like may be removed during the movement of the potatoes from the conveyor 100 to the conveyor 111, I have provided a blower nozzle 118 which is connected to an air pipe 119 and the air pipe 119 is connected to a blower 120. The blower 120 is operated by means of a chain 121 engaging a sprocket 122 carried by the blower shaft 123. The chain 121 engages about a sprocket 124 which is fixed to the shaft 76. The nozzle 118 as shown in Figure 3 has a length substantially equal to the width of the conveyor 100.

The conveyor 111 is operated by means of a chain 125 which engages about a sprocket on a shaft 126 at the lower end of an elevator 127. The elevator 127 comprises cleats 128 which are secured to bars or links 129 in spaced apart relation and the lower portion of the conveyor 127 engages about sprockets 130 secured to the shaft 126. The potatoes are discharged from the conveyor 111 onto the conveyor 127 and preferably a spring pressed or flap shield 131 is interposed between the discharge end of the conveyor 111 and the receiving end of the conveyor 127. The rockable shield 131 is adapted to be rocked upwardly on pivotal mounting 132 thereof when the cleats 128 strike the underside of the shield 131 and if desired, this shield 131 may gravitatingly swing downwardly or may be spring pressed to normally hold the shield 131 in a downwardly inclined position. As the conveyor 127 moves upwardly on its receiving run, the cleats 128 will ride under the shield 131 as shown in dotted lines in Figure 13 until one of the cleats 128 passes beneath the shield 131, whereupon this shield will rock downwardly and thus prevent the potatoes from rolling downwardly and off of the lower end of the conveyor 127.

The conveyor 127 is provided with a pair of side walls or guards 133 which are adapted to prevent the potatoes from rolling laterally off of the conveyor. The side walls or guard members 133 are secured to a pair of upwardly inclined bars or frame members 134 which at their lower ends are secured to a horizontal frame member 135. The horizontal frame member 135 is provided adjacent the rear portion thereof with bearings 136 within which the shaft 126 is journalled and upright frame members 137 are secured at their lower ends to the frame members 135 and at their upper ends to the upper ends of the inclined elevator frame members 134. The elevator 127 is operated by means of a chain 138 which at its lower portion is trained over a sprocket 139 carried by a shaft 140. The upper end of the conveyor 127 engages sprockets carried by a shaft 141 which has a driving sprocket 142 secured thereto and about which the chain 138 engages.

Figure 6:
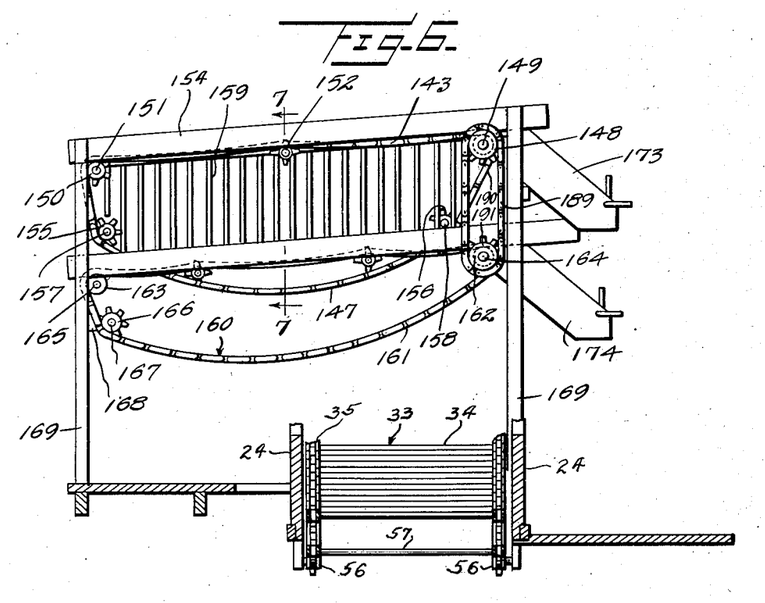
Figure 6 is a sectional view taken on the line 6—6 of Figure 1.
Figure 7:
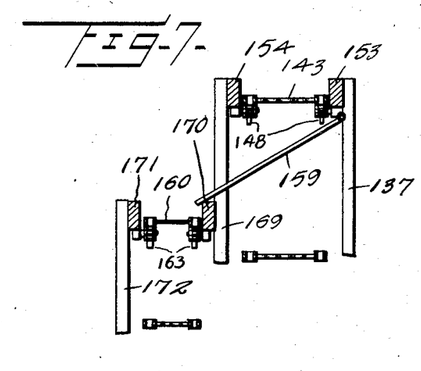
Figure 7 is a sectional view taken on the line 7—7 of Figure 6.

The potatoes elevated to the top of the elevator 127 are discharged onto a movable grading member 143 which is constructed in the form of an endless conveyor as shown in Figure 6 and comprises transversely extending bars or links 144 having arcuate portions 145 intermediate the ends thereof and the terminal ends of the bars 144 are provided with angularly disposed hook portions 146. The hook portions of one bar or link 144 are adapted to engage at the angle between the hook portions of an adjacent grading bar as shown in Figure 15. The bars or links 144 are trained about sprockets 148 carried by a shaft 149 and also about sprockets 150 secured to a shaft 151. An agitator member 152 is disposed between the ends of the chute formed by side rails 153 and 154 engaging on opposite sides of the conveyor or grading member 143. Lower idler sprocket members 155 and 156 are mounted on shafts 157 and 158 respectively as shown in Figure 6. The smaller potatoes which drop through the grading member 143 slide downwardly on inclined guide bars 159 which are disposed at an inclination to the horizontal and guide the potatoes to a second grading member 160. The grading member 160 is constructed similar to the grading member 143 but is provided with relatively smaller loops than the loops 145 in the grading bars 144 and the grading member 160 is provided with interlocking ends 161 and engages about sprockets 162 and 163 secured to shafts 164 and 165 respectively. Idler sprockets 166 are secured to a shaft 167 which is journalled in bearings 168 carried by upright frame members 169. The frame members 169 support the side members 154 of the first grading member and also support an inner side member 170 in one side of the grading member 160. A second side member 171 on the opposite side of the grading member 160 is supported by uprights 172. The uprights 172 also support the bearings for the shafts 167 and 162. The graded potatoes carried by the first grading member 143 are discharged into a pair of chutes or receiving members 173 which are disposed in outwardly and downwardly divergent relation and bags or the like are adapted to be secured to the discharge end of the chutes 173. The discharge end of the grader 160 is adapted to have a receiving chute 174 which as shown in Figure 6 is downwardly inclined and is adapted to have means at the lower end thereof to which a bag may be attached so that the potatoes moving downwardly in the chutes 173 and 174 will drop directly into the bags.

Figures 1, 11:
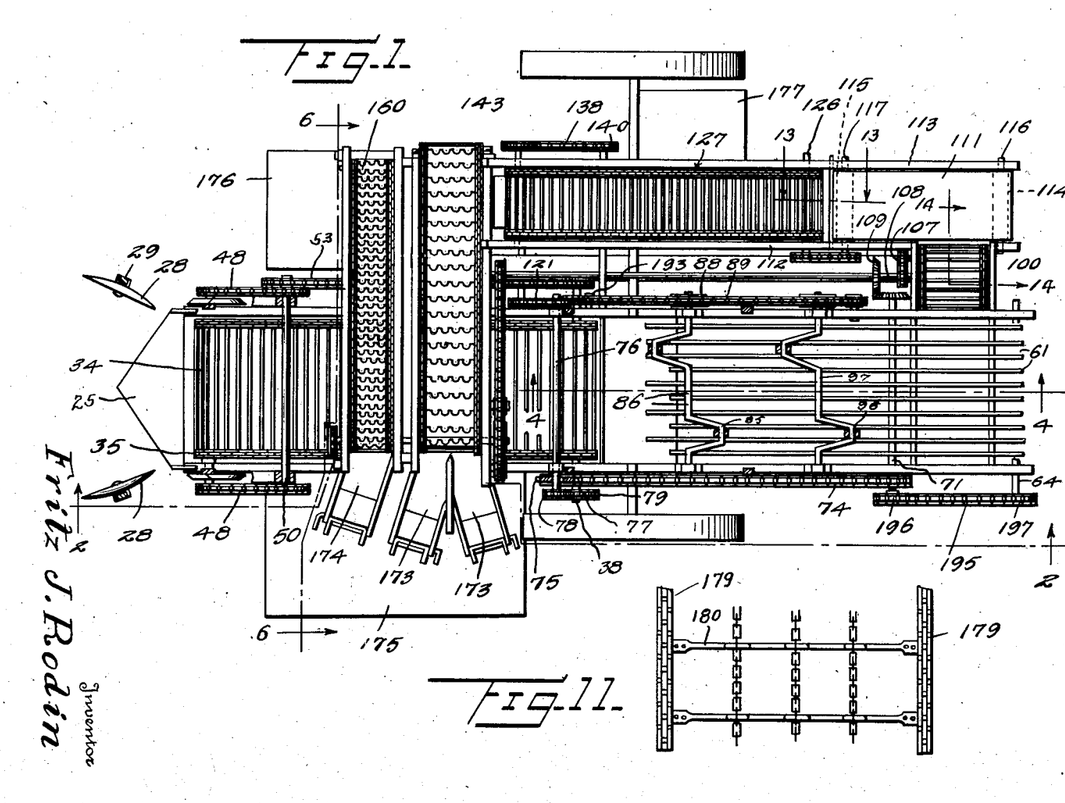
Figure 1 is a detail top plan partly in horizontal section of a potato digging and harvesting machine constructed according to an embodiment of this invention.
Figure 11 is a fragmentary plan view of the vine conveyor shown in Figure 9.

A platform 175 is disposed below the delivery members 173 and 174 and a second platform 176 is disposed on the opposite side of the machine adjacent the opposite end of the grading members 143 and 160 as shown in Figure 1. A third platform 177 is positioned adjacent the elevator 127 so that the condition of the potatoes being elevated can readily be determined and if desired, a person may stand on the platform 177 and remove from the conveyor 127 any potato vines which may still adhere to the potatoes.

Figure 8:
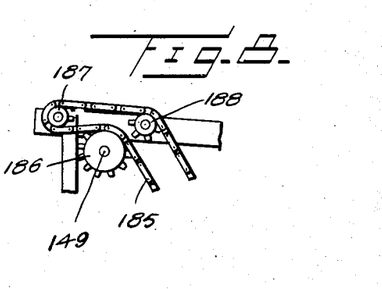
Figure 8 is a fragmentary side elevation taken on the line 8—8 of Figure 2.
Figure 9:
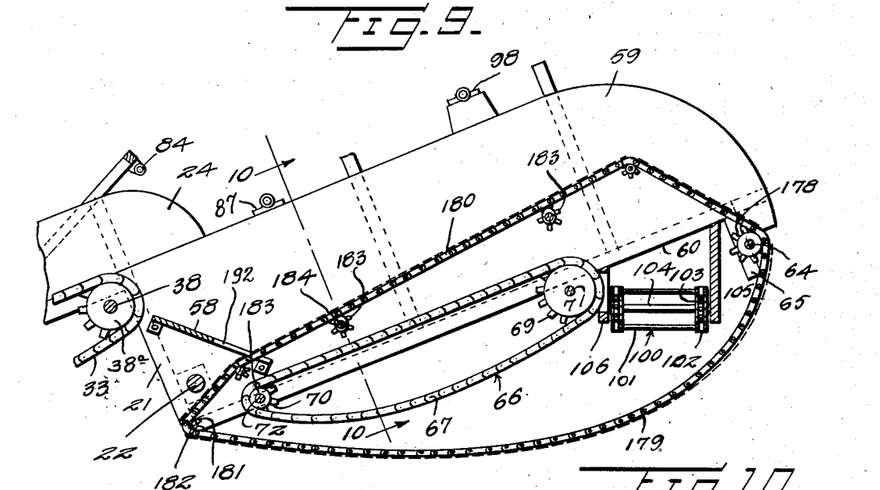
Figure 9 is a sectional view similar to Figure 4, but showing the modified form of the conveyor and dirt removing structure.

In Figure 9 there is disclosed a conveyor structure for the potatoes which are elevated by means of a devining conveyor which is adapted to be used in the event the ground is wet at the time of the digging of the potatoes. In this instance, the parallel bars 61 shown in Figure 4 are removed and shaft 64 is provided with sprockets 178 and conveyor chains 179 engage the sprockets 178. The chains 179 have secured therebetween parallel bars 180 which are spaced sufficiently to permit the potatoes to drop therethrough and onto the conveyor 66. The grading members 143 and 160 are operated by means of a chain 185 which at its lower portion is trained over a sprocket secured to the shaft 108. The shaft 149 is provided with a sprocket 186 which engages the lower run of the chain 185 and this chain also is trained about a pair of idler sprockets 187 and 188 as shown in Figure 8 which are positioned on opposite sides of the sprocket 186. The two grading members 143 and 160 are operatively connected together by a chain 189 engaging a sprocket 190 secured to the shaft 149 and also a sprocket 191 secured to the shaft 164. The chains 179 at their forward ends are trained about idler sprockets 181 carried by a shaft 182 and in order to provide means whereby any dirt adhering to the potatoes may be loosened therefrom and also to shake the potatoes from the vines, I have provided a plurality of agitating sprocket members 183 which are mounted on shafts 184 extending between the side wall members 59.

When the bars 61 are in use, these bars 61 have their inner ends preferably mounted in openings 192 provided in the shield 58. Where the devining conveyor comprising the side chains 179 and the bars 180 is substituted for the parallel bars 61, the oscillatable fingers or forks 80 and 81 may be removed and the operating means therefor disconnected. As shown in Figure 3, the chain 89 for the oscillating members 80 and 81 is trained about a plurality of idler sprockets 193 which serve as a chain tightening means. The chain 89 is operatively connected to the driving shaft 38 and in order to disconnect the chain 89 it is only necessary to lift the chain 89 from the idler sprockets and the sprocket members 88 and 99. At the time the conveyor 179 is in use, this conveyor is operated by means of a chain 195 which engages about a sprocket 196 secured to the shaft 71 and also a sprocket 197 secured to the shaft 64. Where the bars 61 are substituted for the conveyor 179, the chain 195 and shaft 64 may be disconnected.

Figures 10, 12:
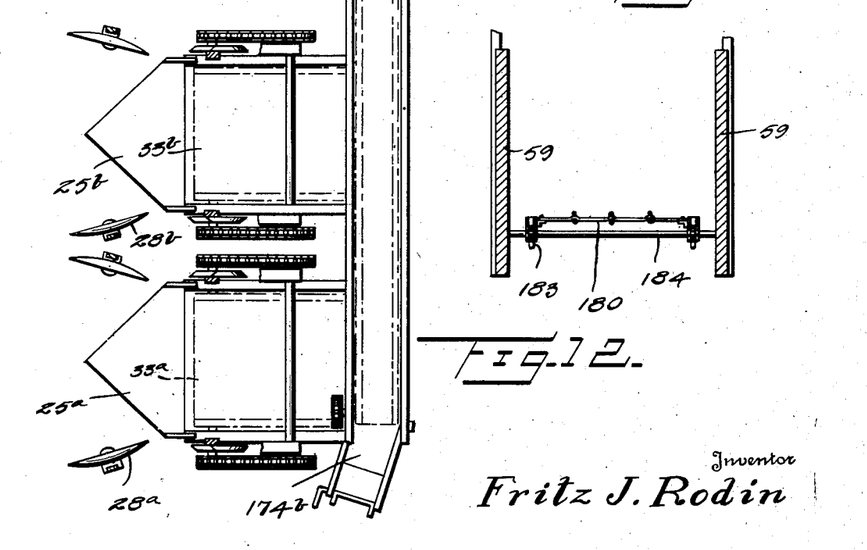
Figure 10 is a sectional view taken on the line 10—10 of Figure 9.
Figure 12 is a fragmentary plan view partly in section of a modified form of digger structure using the plows.

In Figure 12 there is disclosed the forward or digging end of a modified form of potato digging and harvesting machine wherein two plow members 25$^a$ and 25$^b$ are disposed in spaced apart relation, the space between the plow members 25$^a$ and 25$^b$ being sufficient to engage a pair of rows of potatoes. The plow 25$^a$ has an elevator 33$^a$ associated therewith and the plow 25$^b$ has an elevator 33$^b$ associated therewith which elevators are similar in every detail to the elevator 33. The remaining structure associated with the elevators 33$^a$ and 33$^b$ is similar to the structure associated with the elevator 33 and the digging member 25, there being a pair of disc members 28$^a$ forwardly of the plow 25$^a$ and a pair of disc members 28$^b$ forwardly of the plow or digging member 25$^b$.

Where at least two digging members 25$^a$ and 25$^b$ and used, the vine removing and cleaning structure associated with the elevator 33 may be made sufficiently wide to take care of the extra volume of potatoes being elevated by the two elevating members 33$^a$ and 33$^b$. The balance of the structure will be the same as that hereinbefore described. The chain member 89 as shown in Figure 16 engages over a sprocket member 198 secured to the shaft 140 so as to effect rotation of this shaft 140 from the shaft 38. This connection is more clearly shown in Figure 3 wherein the chain 89 is shown as being trained over the upper portion of the sprocket 198. In the event the chain 89 is removed on account of the disconnection of the fingers 80 and 81, a short chain may be substituted therefor which will connect the sprocket 198 with the driving sprocket 54 carried by the shaft 38.

In the event it is desired to substitute non-rotatable shields or guard members for the discs 28, this may be accomplished as shown in Figure 18 by providing shoes or shield members 199 which are adapted to be secured to a vertical bar 200 which is fixed to a horizontal bar 201. The forward end of the bar 201 may be rockably mounted on the lower end of a depending bar 32 in place of the bar 30.

In Figures 19 and 20, there is disclosed a modified form of shaker bar structure over that disclosed in Figure 4, wherein the bars 61$^a$ are connected together at their forward ends to a U-shaped connecting member 202, and these bars 61$^a$ are positioned beneath the discharge end of a shield 58$^a$ which is rockably mounted between the chute or wall members 59$^a$. Agitation of the bars 61$^a$ is effected by means of a crank 203 which is journalled between the wall members 59$^a$ and the crank 203 is provided with a sprocket 204 which engages one run of the chain 74$^a$ similar to the chain 74 and which drives the shaft 71 in Figure 4. The crank 203 is provided with rollers 205 on the offset portion thereof which engage the lowermost bars 61$^a$ so that rotation of the crank shaft 203 will vertically rock the forward ends of the bars 61$^a$ and thus assist in the removal of the potatoes from the vines, and in addition assist in the removal of the dirt from the potatoes.

The conveyors 33, 66, 100 and 127 are constructed similar to the grading conveyors 147 and 160 with the exception that the loops 145 shown in Figure 15 are eliminated. In other words, these conveyors are formed of elongated bars similar to the bars 144 and the ends of the bars are provided with hook members similar to 146 shown in Figure 15. In this manner, the use of chains is eliminated as the sprockets engage between the bars in order to provide movement for the conveyor.

In the use and operation of this potato digging and harvesting machine, the machine may be secured to a tractor through the medium of the draw bars 26 and moved along the rows of the potatoes with the digging member 25 engaging below the surface for a distance sufficiently to dig the potatoes and cause the potatoes to move upwardly into engagement with the first elevator 33. This elevator has spaced apart parallel bars 34 which will permit the dirt to drop down onto the ground and the vines are then carried upwardly and discharged onto the downwardly inclined shield 58.

Assuming that the ground is relatively dry and the potato vines are relatively green so that the potatoes will adhere to the vines, the forks and fingers 80 and 81 may be used. The use of the forks 80 and 81 will also bring in the use of parallel bars 61 so that the oscillation of the fingers 80 and 81 will agitate the potato vines, forcing the vines forwardly and upwardly along the bars 61. The bars 61 are spaced apart sufficiently so that the potatoes will drop therebetween onto the conveyor or elevator 66. This elevator 66 is a perforate elevator which will permit the dirt to drop down onto the ground and the potatoes which at this time are not graded, are discharged by the second elevator 66 onto the transverse conveyor 100. The transverse elevator 100 will discharge the vineless potatoes onto the longitudinal and imperforate conveyor 111. During the movement of the potatoes from the discharge end of the conveyor 100 to the conveyor 111, the potatoes will pass through a blast of air from the air nozzle 118. The loose dirt or dust will thus be blown off of the potatoes. The conveyor 111 discharges the potatoes onto the third elevator 127 which at its upper end delivers the potatoes to the first grading member 143. The larger size potatoes are carried along by the grading member 143 and then discharged into the chutes 173 where they are adapted to enter bags carried by the lower ends of the chute 173. The smaller size potatoes which drop through the grading member 143 gravitatingly slide downwardly along the bars 159 onto the second grading member 160. The smaller potatoes which are rejected or fall through the second grading member 160 may drop onto the ground or if desired, a receiver may be positioned beneath this grading member so as to catch all of the rejected or small size potatoes. The potatoes graded by the grading member 160, that is the potatoes which remain on this member 160 are carried therealong and then discharged on the downwardly inclined chute 174 at the lower end of which a bag is adapted to be positioned to receive the second grade potatoes.

A machine constructed according to this invention will permit the use of a single machine for the varying conditions which prevail at the time the potatoes are being dug and harvested so that it will not be necessary for two different types of machines to be placed in use. In other words, if a potato farmer has a field of potatoes too stoney to be picked by machine, he may remove the fourth elevator 111 and chain 125 as by removing two bolts, the elevator 111 is ready to be lifted out.

What I claim is:

1. A potato digging and harvesting machine comprising a mobile frame, a digging member carried by said frame, a conveyor for conveying the potatoes and vines rearwardly of the machine, a second conveyor extending rearwardly of said first conveyor and having the forward end thereof below the rear end of said first conveyor, a plurality of parallel spaced apart bars disposed above said second conveyor, a guide member between the adjacent ends of said conveyors, said guide member having openings therein and said bars engaging at one end thereof through said openings, means supporting the opposite ends of said bars from the frame, and oscillatable means carried by said frame for moving the vines along said bars.

2. A potato digging and harvesting machine comprising a mobile frame, a digging member carried by said frame, a conveyor for conveying the potatoes and vines rearwardly of the machine, a second conveyor extending rearwardly of said first conveyor and having the forward end thereof below the rear end of said first conveyor, a plurality of parallel spaced apart bars disposed above said second conveyor, a guide member between the adjacent ends of said conveyors, said guide member having openings therein and said bars engaging at one end thereof through said openings, means supporting the opposite ends of said bars from the frame, a plurality of forks, a crank rotatably carried by said frame engaging said forks, and means connected to said frame and said forks for rocking said forks relative to said crank to thereby move the vines along said bars.

3. A potato digging and harvesting machine comprising a mobile frame, a digging member carried by said frame, means for conveying the potatoes and vines rearwardly of said member and means for removing the potatoes from the vines, said removing means comprising a plurality of parallel spaced apart bars disposed in staggered relation, the rear ends of said bars being downwardly curved, means secured to said rear ends of said bars for attaching said bars to the frame, apertured means secured to the frame engaging the forward ends of said bars, a plurality of forks, crank shafts connected to said forks, operating means for said crank shafts, a stem connected to each fork, a link connected at one end to a stem, and means fixed to the frame and connected to the opposite end of a link whereby to rock said forks relative to said cranks upon rotation of said cranks to thereby move the vines longitudinally of said bars.

4. A potato digging and harvesting machine comprising a mobile frame, a digging member carried by said frame, means for conveying the potatoes and vines rearwardly of said member and means for removing the potatoes from the vines, said removing means comprising a plurality of parallel spaced apart bears disposed in staggered relation, the rear ends of said bars being downwardly curved, means secured to said rear ends of said bars for attaching said bars to the frame, apertured means secured to the frame engaging the forward ends of said bars, a plurality of forks, crank shafts connected to said forks, operating means for said crank shafts, a stem connected to each fork, a link connected at one end to a stem, means fixed to the frame and connected to the opposite end of a link whereby to rock said forks relative to said cranks upon rotation of said cranks to thereby move the vines longitudinally of said bars, a conveyor positioned beneath said bars and movable longitudinally thereof for conveying the potatoes rearwardly of the frame, a grading means carried by said frame, and means for conveying the potatoes from said latter conveyor to said grading means.

5. In a potato digging, harvesting and grading machine, a mobile structure including a potato digger at its forward end, a driven vine cutter at the rear of the digger, a rearwardly directed upwardly inclined elevator for conducting off the vines and potatoes from said digger, a vine and potator separator means arranged below and extending rearwardly from said elevator, a shield depending from the rear end of the elevator onto said means for directing the discharge of the vines and potatoes from said elevator onto said means, a conveyor arranged below and disposed transversely of the rear end terminal portion of said means, a conveyor disposed in lengthwise relation to and arranged below said means forwardly of the transverse conveyor for receiving the potatoes from said means and discharging them onto said transverse conveyor, a front and a rear driven endless combined potato conveyor and grader element of skeleton form arranged over said elevator, said rear element arranged above said front element, means leading upwardly from said transverse conveyor for receiving the potatoes from the latter and conducting and discharging them onto the said rear element, and means arranged below the rear element and extending over the front element for conducting to the front element potatoes passing through the said rear element.

6. In a potato digging, harvesting and grading machine, a mobile structure including a potato digger at its forward end, a driven vine cutter at the rear of the digger, a rearwardly directed upwardly inclined elevator for conducting off the vines and potatoes from said digger, a vine and potato separator means arranged below and extending rearwardly from said elevator, a shield depending from the rear end of the elevator onto said means for directing the discharge of the vines and potatoes from said elevator onto said means, a conveyor arranged below and disposed transversely of the rear end terminal portion of said means, a conveyor disposed in lengthwise relation to and arranged below said means forwardly of the transverse conveyor for receiving the potatoes from said means and discharging them onto said transverse conveyor, a front and a rear driven endless combined potato conveyor and grader element of skeleton form arranged over said elevator, said rear element arranged above said front element, means leading upwardly from said transverse conveyor for receiving the potatoes from the latter and conducting and discharging them onto the said rear element, means arranged below the rear element and extending over the front element for conducting to the front element potatoes passing through the said rear element, and a blower for acting on the potatoes passing off said transverse conveyor onto the said conducting means.

7. In a potato digging, harvesting and grading machine, a mobile frame, a potato digging member at the forward end of the frame, a driven vine cutter element at the rear of said member, an elevator carried by the frame, operatively associated with and extending rearwardly from said member and element, a plurality of spaced potato and vine separating bars arranged below and rearwardly of the elevator for receiving the potatoes and vines from the elevator, alternate ones of said bars arranged below the others of said bars, a rotatable shaft mounted transversely of said frame, over said bars and having cranked portions, a plurality of pushers in the form of forks pivotally mounted intermediate their ends on the cranked portions of and bodily carried with said shaft for moving the vines and potatoes along said bars, an upstanding support secured to the frame, and links pivotally connected to said support and to the upper ends of said forks for oscillating the forks on said shaft during the operation of the latter.

8. In a potato digging, harvesting and grading machine, a mobile frame, a potato digging member at the forward end of the frame, a driven vine cutter element at the rear of said member, an elevator carried by the frame, operatively associated with and extending rearwardly from said member and element, a plurality of spaced potato and vine separating bars arranged below and rearwardly of the elevator for receiving the potatoes and vines from the elevator, alternate ones of said bars arranged below the others of said bars, a rotatable shaft mounted transversely of said frame, over said bars and having cranked portions, a plurality of pushers in the form of forks pivotally mounted intermediate their ends on the cranked portions of and bodily carried with said shaft for moving the vines and potatoes along said bars, an upstanding support secured to the frame, and links pivotally connected to said support and to the upper ends of said forks for oscillating the forks on said shaft during the operation of the latter, the said forks including a plurality of tines and each of said tines being directed from its upper to its lower end upon a rearwardly directed curve.

9. In a potato digging, harvesting and grading machine, a mobile frame, a potato digging member at the forward end of the frame, a driven vine cutter element at the rear of said member, an elevator carried by the frame, operatively associated with and extending rearwardly from said member and element, a plurality of spaced potato and vine separating bars arranged below and rearwardly of the elevator for receiving the potatoes and vines from the elevator, alternate ones of said bars arranged below the others of said bars, a rotatable shaft mounted transversely of said frame, over said bars and having cranked portions, a plurality of pushers in the form of forks pivotally mounted intermediate their ends on the cranked portions of and bodily carried with said shaft for moving the vines and potatoes along said bars, an upstanding support secured to the frame, and links pivotally connected to said support and to the upper ends of said forks for oscillating the forks on said shaft during the operation of the latter, each of said bars being substantially of like contour and each having its major portion inclining upwardly from its forward to its rear end and its remaining portion disposed downwardly and of curvilinear form.

10. In a potato digging, harvesting and grading machine a mobile frame, an upper row of parallel spaced separator bars, a lower row of spaced parallel separator bars, said bars secured within the rear portion of said frame and each bar consisting of a portion inclining upwardly from its forward end and a down-turned portion leading from the said other portion, a combined digger, elevator and shield structure for directing potatoes and vines onto said rows of bars, a plurality of fork-like forward pushers, a rotatable crank shaft carried by the frame and having cranked portions upon which said pushers intermediate their ends are pivotally mounted, a link pivotally supported at one end and pivotally connected at its other end to the upper end of each pusher, a plurality of fork-like rear pushers, a rotatable crank shaft carried by the frame and having cranked portions to which said rear pushers are pivotally connected to intermediate the ends of such pushers, a link pivotally supported at one end and having its other end pivotally connected to the upper end of each rear pusher, said pushers disposed in superposed relation with respect to said bars, said bars providing for the separation of the potatoes from the vines and said pushers providing for discharging the vines from said bars.

FRITZ JOAKIM RODIN.